United States Patent
Sharma et al.

(10) Patent No.: US 11,902,786 B1
(45) Date of Patent: Feb. 13, 2024

(54) SIM SWAP FRAUD PREVENTION

(71) Applicant: T-Mobile USA, Inc., Bellevue, WA (US)

(72) Inventors: Anuj Sharma, Broadlands, VA (US); Chris Jensen, Snoqualmie, WA (US); Rajil Malhotra, Olathe, KS (US); Sriharsha Kadalbal, Sammamish, WA (US); Deepesh Belwal, Ashburn, VA (US); Tupalli Shruthisagar, Aldie, VA (US); Dipta Biswas, Bothell, WA (US); Anil Kumar Mariyani, Ashburn, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 78 days.

(21) Appl. No.: 17/446,860

(22) Filed: Sep. 3, 2021

(51) Int. Cl.
   *H04W 12/72* (2021.01)
   *H04W 12/40* (2021.01)
   *H04W 12/30* (2021.01)
   *G06F 21/88* (2013.01)
   *H04W 12/126* (2021.01)
   *H04W 4/14* (2009.01)

(52) U.S. Cl.
   CPC ............ *H04W 12/35* (2021.01); *G06F 21/88* (2013.01)

(58) Field of Classification Search
   CPC ............................ H04W 12/35; G06F 21/88
   See application file for complete search history.

(56) References Cited

U.S. PATENT DOCUMENTS

| 10,178,223 B1 * | 1/2019 | Marimuthu .......... H04B 1/3816 |
| 2021/0195411 A1 * | 6/2021 | Ratnakaram ........ H04L 63/0861 |

FOREIGN PATENT DOCUMENTS

| EP | 3993471 A1 * | 5/2022 | .......... H04W 12/121 |
| WO | WO-2021083503 A1 * | 5/2021 | .......... H04W 12/126 |

OTHER PUBLICATIONS

Christopher Faircloth, Gavin Hartzell, Nathan Callahan, Suman Bhunia; "A Study on Brute Force Attack on T-Mobile Leading to SIM-Hijacking and Identity-Theft"; 2022 IEEE World AI IoT Congress (AIIoT); Year Apr. 2022; Conference Paper; Publisher: IEEE; pp. 501-507 (Year: 2022).*

\* cited by examiner

*Primary Examiner* — Khoi V Le
*Assistant Examiner* — Courtney D Fields
(74) *Attorney, Agent, or Firm* — Lee & Hayes, P.C.

(57) ABSTRACT

A carrier network may detect and prevent completion of SIM swap frauds. For example, a carrier network may, based at least in part on a SIM swap request to replace a first SIM associated with a subscriber with a second SIM, store first information associated with the first SIM. Subsequent to the execution of a SIM swap to replace the first SIM with the second SIM, the carrier network may perform fraud detection on the SIM swap based at least in part on the first information associated with the first SIM stored based at least in part on the SIM swap request and based at least in part on second information associated with the second SIM and based at least in part on the SIM swap being detected as fraudulent by the fraud detection, cause the second SIM to be prohibited from operating with respect to the subscriber.

12 Claims, 5 Drawing Sheets

SIM SWAP FRAUD PREVENTION

BACKGROUND

A subscriber identity module (SIM) is a component of a user equipment (UE) that can store data, such as a unique serial number associated with the SIM, an international mobile subscriber identity (IMSI) number, security authentication data, contact data, capability data, service data, and/or the like. In some examples, a SIM can be an integrated circuit (e.g., a "SIM card") that can be inserted and removed from a UE. In some examples, a SIM can be an embedded-SIM (eSIM), which can be a programmable SIM that is embedded directly into a UE. In some examples, user accounts associated with SIMs are vulnerable to fraudulent attacks. For example, malicious actors can impersonate subscribers to perform SIM swaps. This can result in undesirable disclosure of information, detrimental utilization of user accounts, and/or unauthorized transfers of funds.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
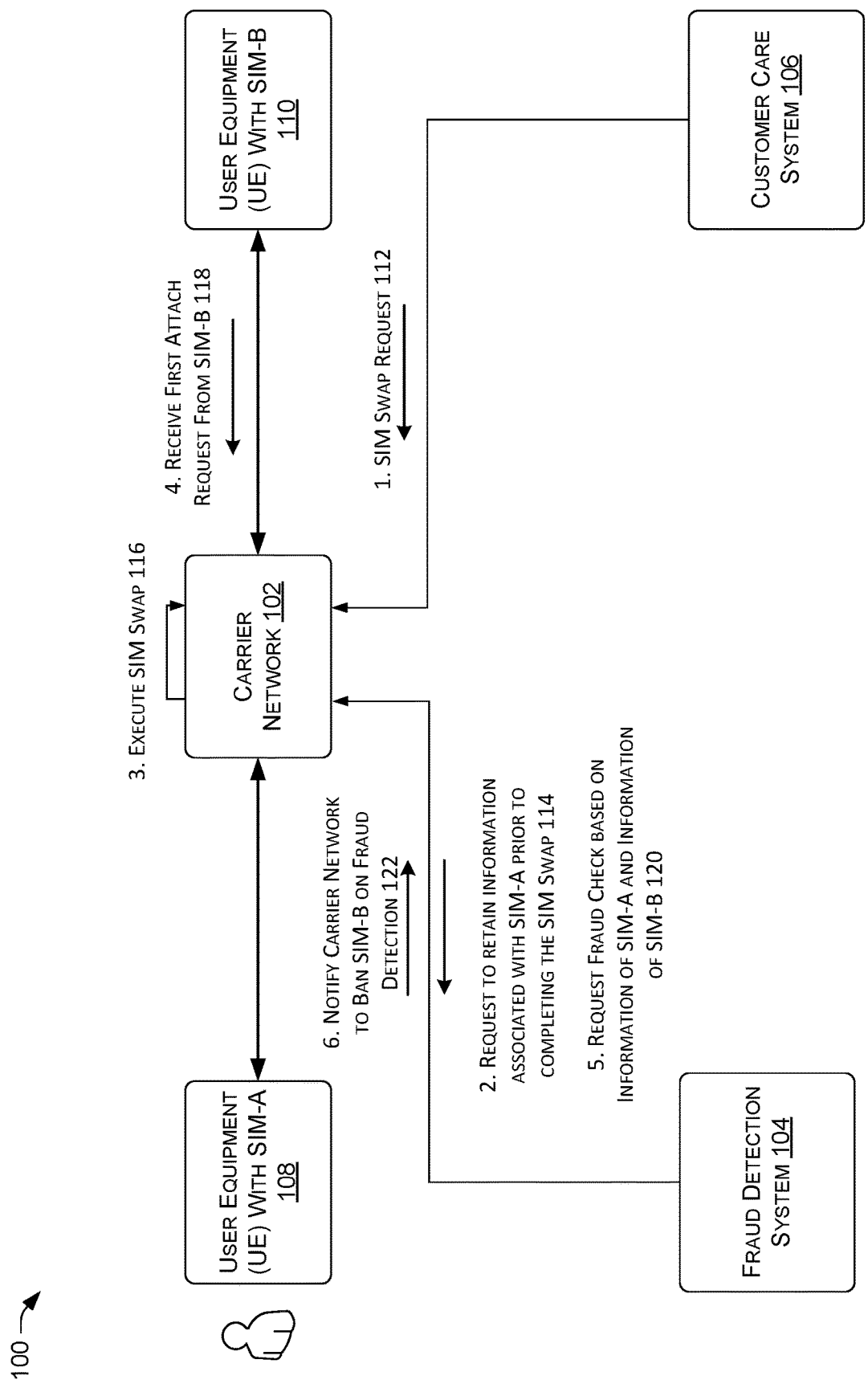
FIG. 1 is a block diagram illustrating an example telecommunication system which may detect and prevent completion of SIM swap frauds, according to some implementations.

The described implementations include devices, systems, and methods that may detect and prevent completion of SIM swap frauds. In some examples, a SIM swap fraud may be attempted by a fraudster by requesting a SIM (SIM-A) of a subscriber be replaced with a different SIM (SIM-B) while impersonating the subscriber associated with SIM-A in communications with a representative of the carrier network (e.g., customer care). In some examples, the disclosed devices, systems, and methods may detect and prevent completion of SIM swap frauds despite the fraudster having much or all of the personal and/or security information of the subscriber being impersonated. As used herein, the completion of a SIM swap fraud is prevented when the fraud is detected and further use of SIM-B is blocked before the fraudster can make substantive use of the subscriber's account.

In some examples, when a SIM swap is requested by a fraudster who has successfully impersonated the subscriber associated with the current SIM (e.g., SIM-A) in communications with, for example, customer care, information may be retained for SIM-A for subsequent use in SIM swap fraud detection. This information may include mobility information with respect to location, registration timestamp, Mobility Management Entity (MME)/Access and Mobility Management Function (AMF) and so on. The information may be captured and/or retained by, for example, a provisioning system or other system involved in the SIM swap process or a fraud detection system may be notified of the pending SIM swap and the fraud detection system may operate to capture and retain the information. Once the information for SIM-A is retained, the SIM swap may proceed and the requested SIM (e.g., SIM-B) is activated to the subscriber account.

When SIM-B is used in operations after the SIM swap, additional information for use in fraud detection may be captured. The additional information may the same, similar or different types of information as captured for SIM-A before the SIM swap was executed. In some examples, the carrier network may receive a first network attach request from a user equipment operating with SIM-B. The carrier network may detect the network attach as the first network attach for SIM-B. For example, an equipment identity register (EIR) may detect an International Mobile Equipment Identity (IMEI)/International Mobile Subscriber Identity (IMSI) check as the first IMEI/IMSI check for SIM-B. Based on the detection of the first use of SIM-B in operations, information for SIM-B may be captured for fraud detection. For example, the EIR may capture the information and provide the information to a fraud detection system along with a notification or the EIR may notify the fraud detection system and the fraud detection system may capture the information.

Once the additional information is retained, the fraud detection system may utilize the information retained for SIM-A and the additional information retained for SIM-B to perform fraud detection. In some examples, the fraud detection may be based at least in part on the location and/or access systems of SIM-A and SIM-B. For example, if the location detected for SIM-B differs from the location detected for SIM-A prior to the SIM swap (e.g., more than some threshold) or the network attach using SIM-B is being performed in a network cell distant from the network cell in which SIM-A was operating, the fraud detection system may identify the SIM swap as being fraudulent. Examples of fraud detection that may be utilized by examples are not limited to physical location and access systems and may also include performing audit checks with respect to banking or financial transactions, stock market investments, and the like on messaging platforms immediately after the SIM Swap; performing checks on any unusual calling or text patterns, performing checks for any other suspicious activity and so on.

When a SIM swap is identified as fraudulent, actions may be performed to address the fraud (e.g., by the fraud detection system and/or by the carrier network). Example actions to address a detected SIM swap fraud may include banning the devices used in the fraud (e.g., SIM-B and the UE operating with SIM-B may be black-listed and/or pushed into dormant mode), performing additional investigatory actions with respect to SIM-B, and notifying the actual subscriber and providing the subscriber with a new SIM with the same MSISDN or a new MSISDN at the subscriber's option.

The devices, systems, and methods that may detect and prevent completion of SIM swap frauds according to this disclosure may provide multiple advantages. First, as mentioned above, the devices, systems, and methods herein may detect and prevent completion of SIM swap frauds despite the fraudster having much or all of the personal and/or security information of the subscriber being impersonated. Second, examples according to this disclosure may improve the network operator's response time to SIM swap frauds as the SIM swap may be detected as fraudulent in less than a second after the fraudster's UE first attempts usage of SIM-B in operation (e.g., from the first network attach request using SIM-B).

FIG. 1 illustrates an example telecommunication system 100, which may detect and prevent completion of SIM swap frauds, according to some implementations. The system 100 includes a carrier network 102, a fraud detection system 104, a customer care system 106, a user equipment (UE) 108 with SIM-A, a and a user equipment (UE) 110 with SIM-B.

Generally, in some examples, the carrier network 102 may operate to provide telecommunications services to user equipment such as UE 108 and UE 110. More particularly, a subscriber associated with the UE 108 and SIM-A may describe the services provided by the carrier associated with the carrier network 102. The fraud detection system 104 and customer care system 106 may be associated with the carrier network 102 (e.g., as systems of the carrier associated with carrier network 102).

The carrier network 102, fraud detection system 104 and customer care system 106, as well as the UEs 108 and 110 may be capable of communicating over wired networks, and/or wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future network technology or evolution of an existing network technology (e.g., IP or Non-IP based). These are merely examples and the carrier network 102, fraud detection system 104 and customer care system 106, as well as the UEs 108 and 110 may be capable of communicating via one or more of a 3G, 4G, 4G LTE, and/or 5G protocols.

During a SIM swap fraud attempt, a fraudster may contact the customer care system 106 and impersonate the subscriber associated with SIM-A. After successfully impersonating the subscriber associated with SIM-A, the fraudster may request that SIM (SIM-A) be replaced with a different SIM (SIM-B) of the fraudster. Because the fraudster had the information to authenticate as the subscriber, the customer care system 106 may send a SIM swap request 112 to the carrier network 102.

The carrier network 102 may receive the SIM swap request 112. Prior to completing the SIM swap, the carrier network 102 may send a request 114 to the fraud detection system 104 to retain information associated with SIM-A. This information may include mobility information with respect to location, registration timestamp, MME/AMF and so on. The information may be captured, for example, by the carrier network 102 or other system involved in the SIM swap process and provided to the fraud detection system 104 or the fraud detection system 104 may operate to capture and retain the information. Additionally or alternatively, the fraud detection system 104 may receive the request 114 and interact with other devices in the carrier network 102 to capture and/or retain the information.

Once the information for SIM-A is retained, the carrier network 102 may execute the SIM swap and the requested SIM (e.g., SIM-B) may be activated to the subscriber account. In some examples, because some or all of the information to be retained may be overwritten in the carrier network 102 once the SIM swap has been executed, the execution of the SIM swap may be postponed until the carrier network 102 is notified by the fraud detection system 104 that the information has been retained.

When SIM-B is used in operations after the SIM swap (e.g., when UE 110 is used with SIM-B), the carrier network 102 may receive a first attach request 118 from the UE 110 operating with SIM-B. The carrier network 102 may determine the attach request 118 is a first attach request from SIM-B and request a fraud check from the fraud detection system 104. In some examples, the carrier network 102 may send a request 120 for a fraud check to the fraud detection system 104 with information of UE 110 and SIM-B for use in the fraud detection operations. The additional information may the same, similar or different types of information as captured for SIM-A before the SIM swap was executed. In some examples, information for SIM-B may be captured for fraud detection by the carrier network 102 based on the detection of the first attach request 118 or the fraud detection system 104 may capture the information in response to the request 120.

Once the additional information for SIM-B is retained, the fraud detection system 104 may utilize the information retained for SIM-A and the additional information retained for SIM-B to perform fraud detection operations. In some examples, the fraud detection operations may be based at least in part on the location and/or access systems of SIM-A and SIM-B. For example, if the location detected for SIM-B differs from the location detected for SIM-A prior to the SIM swap (e.g., more than some threshold) or the network attach using SIM-B is being performed in a network cell distant from the network cell in which SIM-A was operating, the fraud detection system 104 may identify the SIM swap as being fraudulent. Examples of fraud detection operations that may be utilized by examples are not limited to physical location and access systems and may also include performing audit checks with respect to banking or financial transactions, stock market investments, and the like on messaging platforms immediately after the SIM swap; performing checks on any unusual calling or text patterns, performing checks for any other suspicious activity and so on.

When a SIM swap is identified as fraudulent, the fraud detection system 104 may operate to prevent the completion of the fraud attempt. For example, the fraud detection system 104 may notify the carrier network 102 of the fraud and request the carrier network 102 ban SIM-B and/or UE 110 (e.g., SIM-B and the UE operating with SIM-B may be black-listed and/or pushed into dormant mode) and/or the fraud detection system 104 and the carrier network 102 may take other actions to address the fraud. Example actions to address a detected SIM swap fraud may include performing additional investigatory actions with respect to SIM-B, and notifying the actual subscriber and providing the subscriber with a new SIM with the same MSISDN or a new MSISDN at the subscriber's option. The fraud detection system may further log events of the fraud attempt with appropriate time stamps.

Figure 2A:
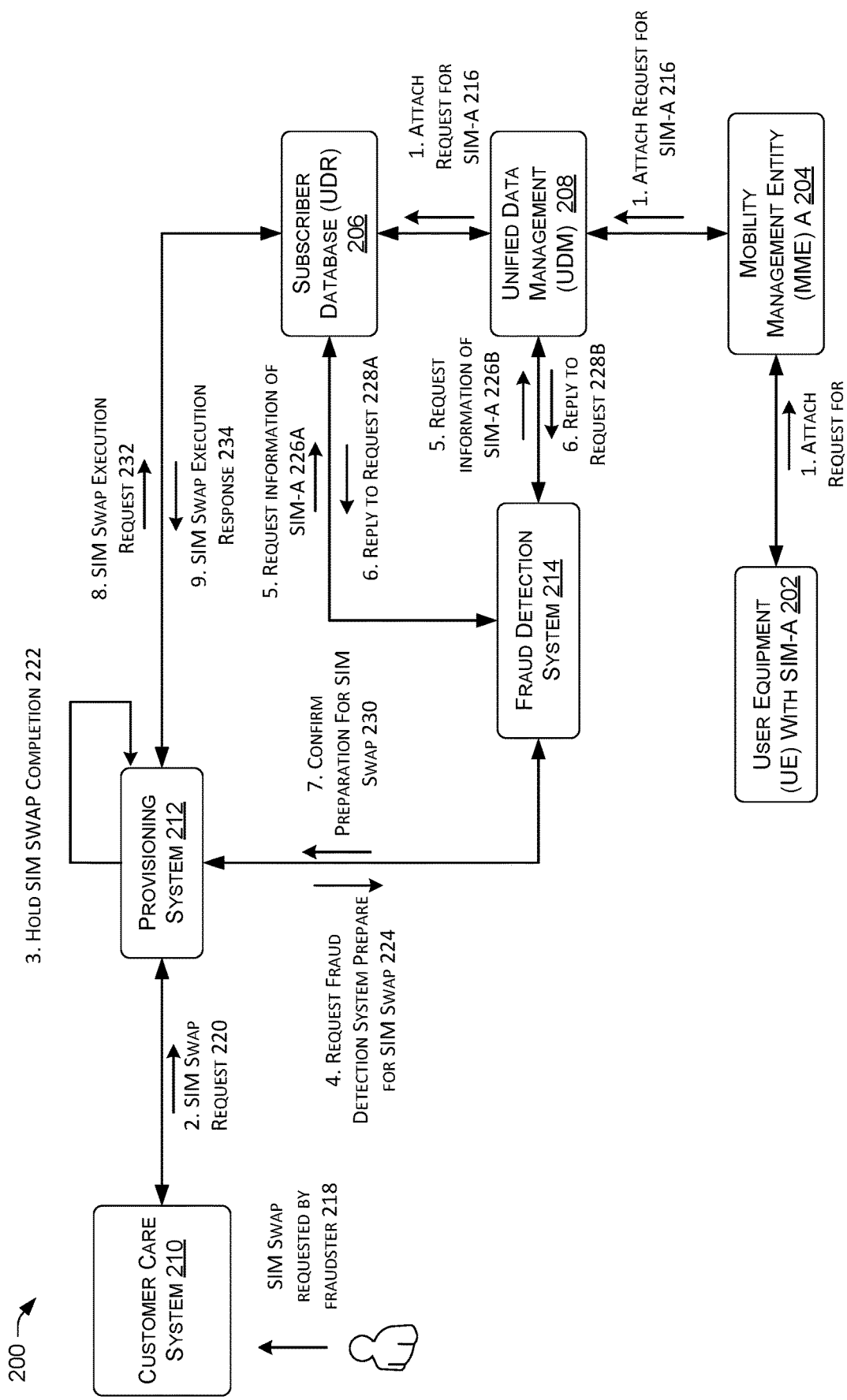
FIG. 2A is a block diagram illustrating an example communication flow for detecting and preventing completion of SIM swap frauds, according to some implementations.
Figure 2B:
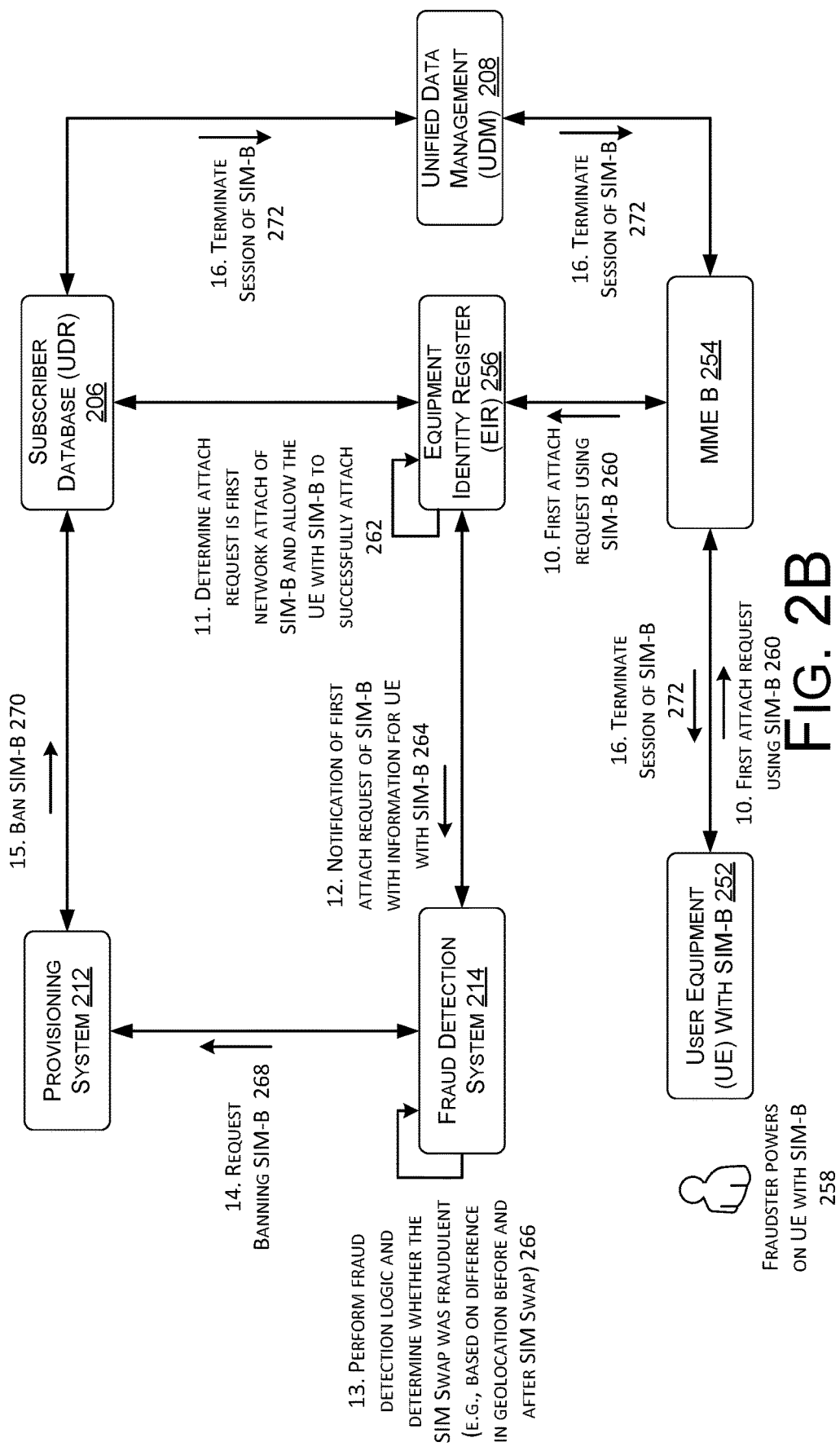
FIG. 2B is a block diagram illustrating an example communication flow for detecting and preventing completion of SIM swap frauds, according to some implementations.

While FIG. 1 illustrates a simplified and generalized example system and communication flow for detecting and preventing completion of SIM swap frauds, implementations are not limited to the specifics of FIG. 1. Rather, details may vary from implementation to implementation. FIGS. 2A and 2B illustrate a particular example communication system and communication flow in example implementations.

FIG. 2A illustrates an example communication flow 200 for detecting and preventing completion of SIM swap frauds, according to some implementations. In the illustrated example, the system includes user equipment (UE) 202 with SIM-A, a Mobility Management Entity (MME) A 204, subscriber database (UDR) 206, a unified data management (UDM) 208, a customer care system 210, a provisioning system 212 and a fraud detection system 214. In the illustrated example, the data flow may relate to an implementation of the disclosed systems and methods in a carrier network.

Generally, in some examples, the MME A 204 may operate to authenticate user devices by interacting with the UDM 208. Specifically, the MME 204 may send an update location request (ULR) to the UDM 208 upon receiving an attach request from a UE 202. The ULR may cause the UDM 208 to authorize the requested service for the UE 202. Further, the MME 204 may operate to connect user devices with an appropriate application server. Specifically, the MME 204 may receive an update location answer (ULA) that authorizes the requested service for the UE 202.

The subscriber database 206 may be the database where various types of data is stored. For example, the subscriber database may store information associated with subscribers, such as records comprising subscriber identifiers such as IMSIs, MSISDNs, service parameters, whether a subscriber is registered on the network, what switch, access point, cell tower, or other node is serving or has served the subscriber, how the subscriber has been served by the various nodes, location associated information, and network-access information. Subscriber database 206 may contain associations between records containing the information, such as, for example, associations between MSISDNs and IMSIs. For example, the subscriber database 206 may be a 5G User Data Repository (UDR).

The UDM 208 may be a front-end for the user subscription data stored in the subscriber database 206. The UDM 208 may use subscription data that may be stored in subscriber database 206 to execute application logic like access authorization, registration management and reachability for terminating event e.g., SMS. When a UE attaches to the system, the UDM 208 may authorize the access and performs several checks of supported features, barring and restrictions due to e.g., roaming. While the examples discussed herein include a subscriber database as a UDR 206 and a UDM 208, embodiments according to this disclosure are not so limited and may alternatively or additionally include a home subscriber server or other similar system.

The provisioning system 212 may operate to provision user equipment and SIMs for subscriber accounts. For example, the provisioning system 212 may operate to associate UEs and/or subscriber identity modules (SIMs) with subscriber accounts and/or wireless service types. The provisioning system 212 may record changes to subscriber accounts in the subscriber database 206.

The UE 202 may comprise a communication device configured to communicate over a wireless and/or wireline network. UE 202 may also comprise a non-mobile computing device, including, without limitation such things as televisions, desktop computers, a game consoles, set top boxes, home automation components, security system components, and so forth. While examples discussed herein relate to UEs that are IoT devices, implementations are not so limited. For example, mobile computing devices may include, without limitation, a mobile phone (e.g., a smart phone), a tablet computer, a laptop computer, a portable digital assistant (PDA), a wearable computer (e.g., electronic/smart glasses, smart watches, fitness trackers, etc.), a networked digital camera, etc. In this sense, the terms "communication device," "wireless device," "wireline device," "mobile device," "computing device," and "user equipment (UE)" may be used interchangeably herein to describe any communication device capable of performing the techniques described herein.

The UE 202 may communicate with the MME A 204 using an access network (not shown), which may comprise a cellular communication network or other type of wired or wireless network. Examples of wireless access networks include LTE, WIFI, GSM EDGE Radio Access Network (GERAN), UMTS Terrestrial Radio Access Network (UTRAN), and other cellular access networks.

In the operations illustrated in FIG. 2, the UE 202, MME A 204, UDR 206, and UDM 208 may operate to provide connection establishment for the UE 202. Initially, the UE 202 may be configured to generate and send an attach request 216 using the SIM-A to the MME A 204. The MME A 204 may receive the attach request 216 and operate with the UDR 206 and UDM 208 such that the attach request is completed for the requested service and/or connection. In addition, the MME A 204, UDR 206, and UDM 208 may operate to store mobility information with respect to the location, network function hostname, realm, registered timestamp and so on in the UDR. The carrier network may continue operations with respect to the UE 202 operating with SIM-A until a SIM swap 218 is requested by a fraudster (e.g., or the subscriber in the case of a legitimate SIM swap request).

In some examples, when a SIM swap 218 is requested by a fraudster, the fraudster may contact the customer care system 210 and impersonate the subscriber associated with SIM-A and UE 202. After successfully impersonating the subscriber associated with SIM-A, the fraudster may request that the current SIM (SIM-A) be replaced with a different SIM (SIM-B) of the fraudster. In some examples, the fraudster may have the information to authenticate as the subscriber. As such, the customer care system 210 may send a SIM swap request 220 to the provisioning system 212 of the carrier network.

The provisioning system 212 may receive the SIM swap request 220 and place a hold 222 on the completion of the SIM swap (e.g., while preparations may be made for subsequent fraud detection operations). After holding the SIM swap, the provisioning system 212 may send a request 224 to the fraud detection system 214 to prepare for the SIM swap. In some examples, the fraud detection system 214 may prepare for the SIM swap by retaining the information associated with SIM-A and UE 202. This information may include mobility information with respect to location, registration timestamp, MME/AMF and so on. The information may be the mobility data previously stored for the UE 202 during the handling of the attach request 216. The fraud detection system 214 may receive the request 224 and interact with other devices in the carrier network to capture and/or retain the information. More particularly, the fraud detection system 214 may send requests 226A and/or 226B for the information of SIM-A to the subscriber database 206 and/or UDM 208 and receive replies 228A and/or 228B in response thereto. Additionally or alternatively, the provisioning system 212 or other system may retrieve the data and provide the information to the fraud detection system 214 with the request 224. Further, in some examples, the information of SIM-A may be stored, for example, by the provisioning system 212 or other device of the carrier network in a transient database and retrieved therefrom by the fraud detection system 214. Once the information for SIM-A is retained, the fraud detection system 214 may send a confirmation 230 that the preparations for the SIM swap are complete to the provisioning system 212.

The provisioning system 212 may receive the confirmation 230 and, in response, send a SIM swap execution request 232 to the subscriber database 206. The subscriber database 206 may receive the SIM swap execution request 232 and execute the SIM swap. As a result, the requested SIM (e.g., SIM-B) may be activated to the subscriber account as a replacement for SIM-A. The subscriber database 206 may send a SIM swap execution response 234 to the provisioning system 212 to notify the provisioning system 212 of the completion of the SIM swap.

The communication flow 200 then continues to FIG. 2B as communication flow 250.

FIG. 2 illustrates an example communication flow 250 for detecting and preventing completion of SIM swap frauds, according to some implementations. In addition to the items illustrated and discussed above with regard to FIG. 2A, the system includes user equipment (UE) 252 with SIM-B, a Mobility Management Entity (MME) B 254, and an equipment identity register (EIR) 256. In the illustrated example, the data flow may relate to an implementation of the disclosed systems and methods in a carrier network.

Generally, the UE 252 and MME B 254 may operate similarly to the UE 202 and MME A 204 as discussed above. The EIR 256 may be a database used to identify mobile devices which are permitted to utilize the carrier network. Among other information, the EIR 256 may maintain a list of mobile devices (identified by their IMEI) which are to be banned from the network or monitored, for example because the devices have been reported stolen. Thus, as described in greater detail herein, an EIR 256 may associate an IMEI to a registration status or statuses. For example, an EIR 256 may correlate an IMEI (or a range or set of IMEIs) to one of three different registration statuses: black status (e.g., the device is not allowed to utilize the IMS core); gray status (e.g., the device is allowed to utilize the IMS core, but is monitored); or white status (e.g., the device is allowed to utilize the IMS core). The EIR 256 may also correlate an IMEI to one or more IMSIs in order to define valid IMEI/IMSI combinations that are permitted to use the carrier network.

In operation, when the fraudster powers 258 the UE 252 on or otherwise when SIM-B is first used in operations after the SIM swap, the UE 252 may issue a first attach request 260 using the SIM-B. The MME B 254 may receive the first attach request 260 from the UE 252 and, in addition to operations to process the attach request discussed above, the EIR 256 may receive an IMEI/IMSI check as part of processing the attach request. The EIR 256 may perform the IMEI/IMSI check, and assuming the UE 252 has not been flagged, the EIR 256 may allow the attach to continue normally. Additionally, the EIR 256 may determine 262 the IMEI/IMSI check as the first IMEI/IMSI check for SIM-B. Based on the determination that the IMEI/IMSI check is the first IMEI/IMSI check for SIM-B (e.g., the first use of SIM-B in operations), the EIR 256 may send a notification 264 of the first attach request of SIM-B to the fraud detection system 214 with information for the UE 252 with SIM-B. For example, the EIR 256 may capture the information for SIM-B and provide the information to the fraud detection system 214 along with a notification 264. Additionally or alternatively, the EIR 256 may notify the fraud detection system 214 and the fraud detection system may capture the information. The information for SIM-B may the same, similar or different types of information as captured for SIM-A before the SIM swap was executed.

In response to the notification 264 and once the information for SIM-B is retained, the fraud detection system 214 may utilize the information retained for SIM-A and the information retained for SIM-B to perform fraud detection logic 266 to determine whether the SIM swap was fraudulent (e.g., based on difference in geolocation before and after SIM swap). In some examples, the fraud detection logic 266 may include operations based at least in part on the location and/or access systems of SIM-A and SIM-B. For example, if the location detected for SIM-B differs from the location detected for SIM-A prior to the SIM swap (e.g., more than some threshold) or the network attach using SIM-B is being performed in a network cell distant from the network cell in which SIM-A was operating, the fraud detection system 214 may identify the SIM swap as being fraudulent. Examples of fraud detection operations that may be utilized by examples are not limited to physical location and access systems and may also include performing audit checks with respect to banking or financial transactions, stock market investments, and the like on messaging platforms immediately after the SIM Swap; performing checks on any unusual calling or text patterns, performing checks for any other suspicious activity and so on.

If the SIM swap is not identified as fraudulent, the communication flow 200 and 250 may end and the UE 252 may be operated normally with SIM-B. When the SIM swap is identified as fraudulent, the fraud detection system 214 may operate to prevent the completion of the fraud attempt. For example, the fraud detection system 104 may send a request 268 notifying the provisioning system 212 of the fraud and requesting the banning of SIM-B and/or UE 252 (e.g., SIM-B and the UE operating with SIM-B may be black-listed and/or pushed into dormant mode). In the illustrated example, the provisioning system 212 may cause the subscriber database 206 to be updated to include a ban on the SIM-B and/or UE 252. In addition, the subscriber database 206 may send a termination request 272 to the UDM 208 and/or MME B 254. For example, based on the termination request 272, the UDM 208 may send a network initiated detach message towards UE 252. Further, the MME B 254 may send a permanent termination NAS code towards UE 252 so that UE 252 and SIM-B may be pushed into a dormant mode.

The fraud detection system 214 and the carrier may also take other actions to address the fraud. Example actions to address a detected SIM swap fraud may include performing additional investigatory actions with respect to SIM-B, and notifying the actual subscriber and providing the subscriber with a new SIM with the same MSISDN or a new MSISDN at the subscriber's option.

Figure 3:
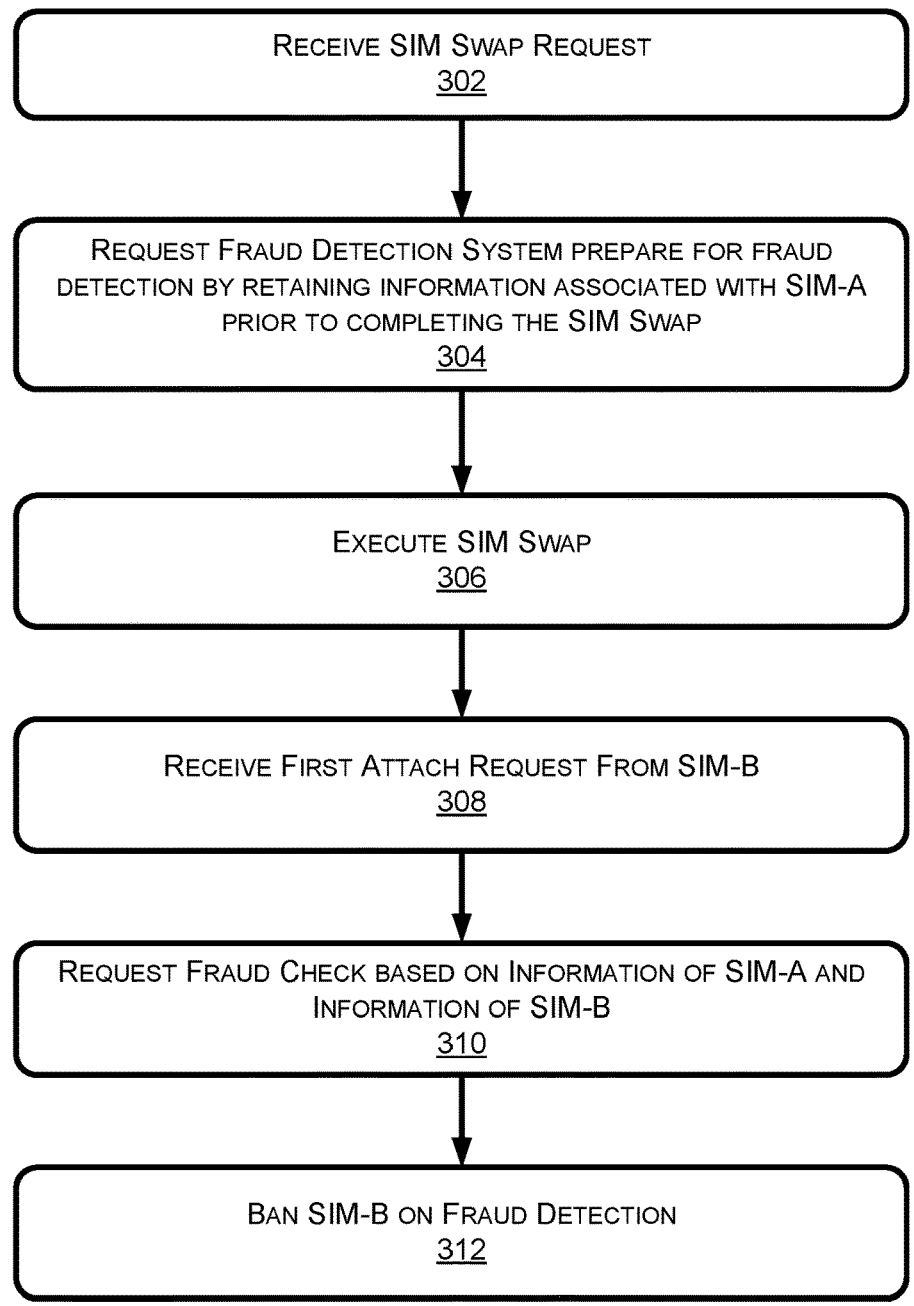
FIG. 3 is a flow diagram illustrating an example method for detecting and preventing completion of SIM swap frauds according to some implementations.

FIG. 3 illustrates an example method 300 for detecting and preventing completion of SIM swap frauds, according to some implementations. More particularly, FIG. 3 illustrates operations of a carrier network (e.g., MMEs 204 and 254, subscriber database 206, UDM 208, customer care system 210, provisioning system 212, fraud detection system 214 and EIR 256) that may provide network services to subscribers and detect and prevent completion of SIM swap frauds.

At 302, the provisioning system of the carrier network may receive a SIM swap request from a customer service system to swap a new SIM (SIM-B) for a current SIM (SIM-A) with respect to a user account. At 304, the provisioning system may request a fraud detection system prepare for fraud detection by retaining information associated with the current SIM prior to completing the SIM swap. For example, the provisioning system may hold the execution of the SIM swap while the fraud detection system performs the requested preparations. The capture and retention of the information for the current SIM may be performed as discussed above with respect to FIGS. 1-2B. At 306, the provisioning system may receive notification of the completion of preparations for the SIM swap and execute the SIM swap. For example, the provisioning system may request the subscriber database swap the new SIM-B for the current SIM-A with respect to the user account.

At 308, the carrier network may receive a first attach request from a UE operating with SIM-B. At 310, the carrier network may request the fraud detection system perform fraud detection operations. For example, a MME may receive the first attach request from the UE operating with SIM-B and, in addition to operations to process the attach request discussed above, the EIR may receive an IMEI/IMSI check as part of processing the attach request. The EIR may perform the IMEI/IMSI check, and assuming the UE has not been flagged, the EIR may allow the attach to continue normally. Additionally, the EIR may determine the IMEI/IMSI check as the first IMEI/IMSI check for SIM-B. Based on the determination that the IMEI/IMSI check is the first IMEI/IMSI check for SIM-B (e.g., the first use of SIM-B in operations), the EIR may send a notification of the first attach request of SIM-B to the fraud detection system with information for the UE with SIM-B. The fraud detection system may utilize the information retained for SIM-A and information about SIM-B to perform a fraud check to determine whether the SIM swap was fraudulent (e.g., based on difference in geolocation before and after SIM swap).

At 312, on detection of the SIM swap as fraudulent, the carrier network may ban SIM-B and/or the UE operating with SIM-B.

Additional details of the operations shown in FIG. 3 are provided above with regard to FIGS. 1-2 B and are not repeated here to avoid unnecessary verbosity.

Figure 4:
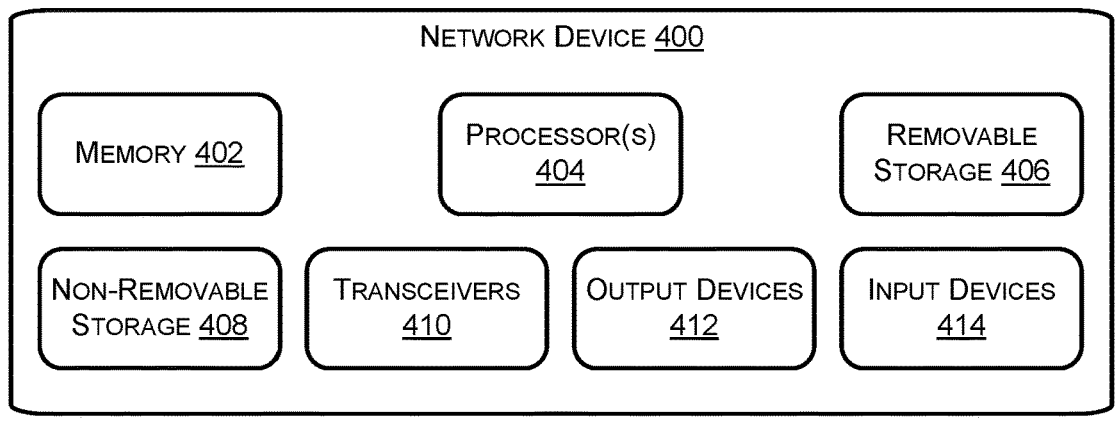
FIG. 4 is a block diagram illustrating relevant high-level components of a device that may be used to implement various of the components described herein.

FIG. 4 illustrates a component level view of a telecommunication network device 400 capable of implementing the UEs 202 and 252, MMEs 204 and 254, subscriber database 206, UDM 208, customer care system 210, provisioning system 212, fraud detection system 214 and EIR 256 of FIGS. 1 and 2. The network device 400 may, as an example, comprise a physical or virtual device. The network device 400 may comprise a system memory 402 storing various executable components and data for implementing the systems and methods of FIGS. 1-3. The network device 400 may further comprise processor(s) 404, a removable storage 406, a non-removable storage 408, transceivers 410, output device(s) 412, and input device(s) 414, any or all of which can be communicatively connected via a communications bus (not shown).

In various examples, the system memory 402 is volatile (such as RAM), non-volatile (such as ROM, flash memory, etc.) or some combination of the two. In some examples, the processor(s) 404 is a central processing unit (CPU), a graphics processing unit (GPU), or both CPU and GPU, or any other sort of processing unit.

The network device 400 also includes additional data storage devices (removable and/or non-removable) such as, for example, magnetic disks, optical disks, or tape. Such additional storage is illustrated in FIG. 4 by removable storage 406 and non-removable storage 408. The system memory 402, removable storage 406 and non-removable storage 408 are all examples of non-transitory computer-readable storage media.

In some examples, the transceivers 410 include any sort of transceivers known in the art. For example, transceivers 410 may include a radio transceiver that performs the function of transmitting and receiving radio frequency communications. Also, or instead, the transceivers 410 may include other wireless or wired connectors, such as Ethernet connectors or near-field antennas. The transceivers 410 may facilitate connectivity between a public network, such as a packet-switched access network (not shown), and one or more other devices of a telecommunication network.

In some examples, the output devices 412 include any sort of output devices known in the art, such as a display, speakers, a vibrating mechanism, or a tactile feedback mechanism. Output devices 412 also include ports for one or more peripheral devices, such as headphones, peripheral speakers, or a peripheral display.

In various examples, the input devices 414 include any sort of input devices known in the art. For example, the input devices 414 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:

1. A method comprising:
based at least in part on a SIM swap request to replace a first subscriber identity module (SIM) of a user equipment (UE) associated with a subscriber with a second SIM, storing, by a fraud detection system, first information associated with the first SIM;
subsequent to an execution of a SIM swap to replace the first SIM with the second SIM, receiving, by a carrier network associated with the UE, an attach request from the UE with the second SIM;
in response to the attach request and a usage of the UE operating with the second SIM, performing, by the fraud detection system, fraud detection on the SIM swap based at least in part on the first information associated with the first SIM stored based at least in part on the SIM swap request and based at least in part on second information associated with the second SIM, wherein an equipment identity register (EIR) of the carrier network detects the usage of the UE operating with the second SIM based at least in part on a first international mobile equipment identity (IMEI)/international mobile subscriber identity (IMSI) check received by the EIR with respect to the second SIM; and based at least in part on the SIM swap being detected as fraudulent by the fraud detection, causing, by the fraud detection system, the second SIM to be prohibited from operating with respect to the subscriber, wherein the fraud detection includes at least two of:
comparing a first physical location of the first SIM with a second physical location of the second SIM;
comparing a first access system connected to the first SIM with a second access system connected to the second SIM; and
performing detection with respect to one or more of calls and text after the SIM swap for unusual patterns.

2. The method of claim 1, further comprising:
receiving the SIM swap request at a provisioning system of the carrier network;
requesting, by the provisioning system, the fraud detection system perform preparations for the fraud detection to be conducted subsequent to the execution of the SIM swap, the preparations for the fraud detection including causing the storing of the first information associated with the first SIM;
receiving, by the provisioning system, confirmation of completion of the preparations; and
at least partly in response to receiving the confirmation, requesting, by the provisioning system, execution of the SIM swap replace the first SIM with the second SIM by a subscriber database.

3. The method of claim 1, wherein storing the first information includes:
receiving, by the fraud detection system, a request to prepare for the fraud detection to be conducted subsequent to the execution of the SIM swap; and
requesting, by the fraud detection system, the first information from a subscriber database.

4. The method of claim 1, further comprising:
receiving, by the fraud detection system, a request performs the fraud detection on the SIM swap; and
at least partly in response to receiving the request to perform the fraud detection, requesting, by the fraud detection system, the second information from a subscriber database.

5. A system comprising:
one or more computing devices of a carrier network configured to perform operations including:
based at least in part on a subscriber identity module (SIM) swap request to replace a first SIM of a user equipment (UE) associated with a subscriber with a second SIM, storing, by a fraud detection system, first information associated with the first SIM;
subsequent to an execution of a SIM swap to replace the first SIM with the second SIM, receiving, by the carrier network, an attach request from the UE with the second SIM;
in response to the attach request and a usage of the UE operating with the second SIM, performing, by a fraud detection system, fraud detection on the SIM swap based at least in part on the first information associated with the first SIM stored based at least in part on the SIM swap request and based at least in part on second information associated with the second SIM, wherein an equipment identity register (EIR) of the carrier network detects the usage of the UE operating with the second SIM based at least in part on a first international mobile equipment identity (IMEI)/international mobile subscriber identity (IMSI) check received by the EIR with respect to the second SIM; and based at least in part on the SIM swap being detected as fraudulent by the fraud detection, causing, by a fraud detection system, the second SIM to be prohibited from operating with respect to the subscriber, wherein the fraud detection includes at least two of:
comparing a first physical location of the first SIM with a second physical location of the second SIM;
comparing a first access system connected to the first SIM with a second access system connected to the second SIM; and
performing detection with respect to one or more of calls and text after the SIM swap for unusual patterns.

6. The system of claim 5, the operations further comprising:
receiving the SIM swap request at a provisioning system of the carrier network;
requesting, by the provisioning system, the fraud detection system perform preparations for the fraud detection to be conducted subsequent to the execution of the SIM swap, the preparations for the fraud detection including causing the storing of the first information associated with the first SIM;
receiving, by the provisioning system, confirmation of completion of the preparations; and
at least partly in response to receiving the confirmation, requesting, by the provisioning system, execution of the SIM swap replace the first SIM with the second SIM by a subscriber database.

7. The system of claim 5, wherein storing the first information includes:
receiving, by the fraud detection system, a request to prepare for the fraud detection to be conducted subsequent to the execution of the SIM swap; and
requesting, by the fraud detection system, the first information from a subscriber database.

8. The system of claim 5, the operations further comprising:
receiving, by the fraud detection system, a request performs the fraud detection on the SIM swap; and
at least partly in response to receiving the request to perform the fraud detection, requesting, by the fraud detection system, the second information from a subscriber database.

9. A non-transitory computer-readable media storing computer-executable instructions, which when executed by one or more processors, cause the one or more processors to perform operations comprising:
based at least in part on a subscriber identity module (SIM) swap request to replace a first SIM of a user equipment (UE) associated with a subscriber with a second SIM, storing, by a fraud detection system, first information associated with the first SIM;
subsequent to an execution of a SIM swap to replace the first SIM with the second SIM, receiving, by a carrier network associated with the UE, an attach request from the UE with the second SIM;
in response to the attach request and a usage of the UE operating with the second SIM, performing, by the fraud detection system, fraud detection on the SIM swap based at least in part on the first information associated with the first SIM stored based at least in part on the SIM swap request and based at least in part on second information associated with the second SIM, wherein an equipment identity register (EIR) of the carrier network detects the usage of the UE operating with the second SIM based at least in part on a first international mobile equipment identity (IMEI)/international mobile subscriber identity (IMSI) check received by the EIR with respect to the second SIM; and based at least in part on the SIM swap being detected as fraudulent by the fraud detection, causing, by the fraud detection system, the second SIM to be prohibited from operating with respect to the subscriber, wherein the fraud detection includes at least two of:
  comparing a first physical location of the first SIM with a second physical location of the second SIM;
  comparing a first access system connected to the first SIM with a second access system connected to the second SIM; and
  performing detection with respect to one or more of calls and text after the SIM swap for unusual patterns.

10. The non-transitory computer-readable media of claim 9, the operations further comprising:
  receiving the SIM swap request at a provisioning system of the carrier network;
  requesting, by the provisioning system, the fraud detection system perform preparations for the fraud detection to be conducted subsequent to the execution of the SIM swap, the preparations for the fraud detection including causing the storing of the first information associated with the first SIM;
  receiving, by the provisioning system, confirmation of completion of the preparations; and
  at least partly in response to receiving the confirmation, requesting, by the provisioning system, execution of the SIM swap replace the first SIM with the second SIM by a subscriber database.

11. The non-transitory computer-readable media of claim 9, wherein storing the first information includes:
  receiving, by the fraud detection system, a request to prepare for the fraud detection to be conducted subsequent to the execution of the SIM swap; and
  requesting, by the fraud detection system, the first information from a subscriber database.

12. The non-transitory computer-readable media of claim 9, the operations further comprising:
  receiving, by the fraud detection system, a request performs the fraud detection on the SIM swap; and
  at least partly in response to receiving the request to perform the fraud detection, requesting, by the fraud detection system, the second information from a subscriber database.

* * * * *